(12) United States Patent (10) Patent No.: US 7,787,128 B2
Lopushansky (45) Date of Patent: Aug. 31, 2010

(54) TRANSDUCER FOR MEASURING ENVIRONMENTAL PARAMETERS

(75) Inventor: Richard Lopushansky, The Woodlands, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 113 days.

(21) Appl. No.: 12/011,057

(22) Filed: Jan. 24, 2008

(65) Prior Publication Data

US 2008/0186506 A1   Aug. 7, 2008

Related U.S. Application Data

(60) Provisional application No. 60/897,093, filed on Jan. 24, 2007.

(51) Int. Cl.
*G01B 9/02* (2006.01)
(52) U.S. Cl. ..................................... 356/480
(58) Field of Classification Search ............... 356/35.5, 356/454, 480, 519; 359/578; 385/12
See application file for complete search history.

(56) References Cited

U.S. PATENT DOCUMENTS

| | | |
|---|---|---|
| 1,432,149 A | 10/1922 | Bellingham |
| 3,923,400 A | 12/1975 | Hardy |
| 4,210,029 A | 7/1980 | Porter |
| 4,329,058 A | 5/1982 | James et al. |
| 4,393,714 A | 7/1983 | Schmidt |
| 4,418,981 A | 12/1983 | Stowe |
| 4,428,239 A | 1/1984 | Johnston |
| 4,572,669 A | 2/1986 | James et al. |
| 4,576,479 A | 3/1986 | Downs |
| 4,583,228 A | 4/1986 | Brown et al. |
| 4,596,466 A | 6/1986 | Ulrich |
| 4,606,638 A | 8/1986 | Sommargren |
| 4,628,211 A | 12/1986 | Ruppert |
| 4,640,616 A | 2/1987 | Michalik |

(Continued)

FOREIGN PATENT DOCUMENTS

DE   3127333   1/1983

(Continued)

OTHER PUBLICATIONS

Int'l Search Report, Jun. 2, 2008, Davidson Energy.

(Continued)

*Primary Examiner*—Michael A Lyons
(74) *Attorney, Agent, or Firm*—John W. Wustenberg; Booth, Albanesi, Schroede LLC

(57) ABSTRACT

Apparatus, methods, and other embodiments associated with measuring environmental parameters are described herein. In one embodiment, a transducer comprises a tube, an elongated member, a first reflective surface, a second reflective surface, and an optical fiber. The tube has a first end and a second end, and the elongated member also has a first end and a second end, with the first end of the elongated member secured to the tube. The second reflective surface is secured to the second end of said elongated member, and the first reflective surface is spaced apart from the second reflective surface and secured to the second end of the tube. The optical fiber is positioned to direct light towards the first and second reflective surfaces and to collect the reflected light from these two surfaces.

20 Claims, 4 Drawing Sheets

U.S. PATENT DOCUMENTS

| | | |
|---|---|---|
| 4,647,203 A | 3/1987 | Jones et al. |
| 4,648,083 A | 3/1987 | Giallorenzi |
| 4,668,889 A | 5/1987 | Adams |
| 4,678,909 A | 7/1987 | Jackson et al. |
| 4,682,500 A | 7/1987 | Uda |
| 4,729,654 A | 3/1988 | Akuta et al. |
| 4,755,668 A | 7/1988 | Davis |
| 4,772,786 A | 9/1988 | Langdon |
| 4,777,358 A | 10/1988 | Nelson |
| 4,787,741 A | 11/1988 | Udd et al. |
| 4,806,016 A | 2/1989 | Corpron et al. |
| 4,844,616 A | 7/1989 | Kulkarni et al. |
| 4,873,989 A | 10/1989 | Einzig |
| 4,907,035 A | 3/1990 | Galburt et al. |
| 4,914,666 A | 4/1990 | Glance |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,089,696 A | 2/1992 | Turpin |
| 5,094,534 A | 3/1992 | Cole et al. |
| 5,119,024 A | 6/1992 | Popovic |
| 5,128,537 A | 7/1992 | Halg |
| 5,128,798 A | 7/1992 | Bowen et al. |
| 5,148,604 A | 9/1992 | Bantien |
| 5,177,805 A | 1/1993 | Groger et al. |
| 5,187,546 A | 2/1993 | Johnston |
| 5,202,939 A | 4/1993 | Belleville et al. |
| 5,202,969 A | 4/1993 | Sato |
| 5,218,418 A | 6/1993 | Layton |
| 5,218,426 A | 6/1993 | Hall et al. |
| 5,225,888 A | 7/1993 | Selwyn et al. |
| 5,239,400 A | 8/1993 | Liu |
| 5,247,597 A | 9/1993 | Blacha et al. |
| 5,276,501 A | 1/1994 | McClintock et al. |
| 5,283,625 A | 2/1994 | Bunn, Jr. |
| 5,319,981 A | 6/1994 | Mei et al. |
| 5,351,317 A | 9/1994 | Weber |
| 5,361,130 A | 11/1994 | Kersey et al. |
| 5,386,729 A | 2/1995 | Reed et al. |
| 5,392,117 A | 2/1995 | Belleville et al. |
| 5,400,140 A | 3/1995 | Johnston |
| 5,401,956 A | 3/1995 | Dunphy et al. |
| 5,401,958 A | 3/1995 | Berkcan |
| 5,420,688 A | 5/1995 | Farah |
| 5,444,724 A | 8/1995 | Goto |
| 5,451,772 A | 9/1995 | Narendran |
| 5,471,428 A | 11/1995 | Baroni et al. |
| 5,477,323 A | 12/1995 | Andrews et al. |
| 5,497,233 A | 3/1996 | Meyer |
| 5,509,023 A | 4/1996 | Glance et al. |
| 5,526,114 A | 6/1996 | Eselun |
| 5,550,373 A | 8/1996 | Cole et al. |
| 5,557,406 A | 9/1996 | Taylor et al. |
| 5,559,358 A | 9/1996 | Burns et al. |
| 5,631,736 A | 5/1997 | Thiel et al. |
| 5,641,956 A | 6/1997 | Vengsarkar et al. |
| 5,646,762 A | 7/1997 | Delavaux et al. |
| 5,647,030 A | 7/1997 | Jorgenson et al. |
| 5,657,405 A | 8/1997 | Fujiwara |
| 5,682,237 A | 10/1997 | Belk |
| 5,739,945 A | 4/1998 | Tayebati |
| 5,760,391 A | 6/1998 | Narendran |
| 5,784,507 A | 7/1998 | Holm-Kennedy et al. |
| 5,796,007 A | 8/1998 | Panagotopulos et al. |
| 5,818,586 A | 10/1998 | Lehto et al. |
| 5,835,214 A | 11/1998 | Cabib et al. |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,889,590 A | 3/1999 | Duggal et al. |
| 5,891,747 A | 4/1999 | Farah |
| 5,910,840 A | 6/1999 | Furstenau |
| 5,923,030 A | 7/1999 | Assard et al. |
| 5,926,591 A | 7/1999 | Labeye et al. |
| 5,929,990 A | 7/1999 | Hall et al. |
| 5,949,801 A | 9/1999 | Tayebati |
| 5,986,749 A | 11/1999 | Wu et al. |
| 5,999,261 A | 12/1999 | Pressesky et al. |
| 5,999,262 A | 12/1999 | Dobschal et al. |
| 6,016,702 A | 1/2000 | Maron |
| 6,020,963 A | 2/2000 | DiMarzio |
| 6,057,911 A | 5/2000 | Reich |
| 6,064,630 A | 5/2000 | Fersht et al. |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,115,521 A | 9/2000 | Tran et al. |
| 6,118,534 A | 9/2000 | Miller |
| 6,122,415 A | 9/2000 | Blake |
| 6,137,621 A | 10/2000 | Wu |
| 6,151,114 A | 11/2000 | Russell |
| 6,157,025 A | 12/2000 | Katagiri et al. |
| 6,173,091 B1 | 1/2001 | Reich |
| 6,178,001 B1 | 1/2001 | Kim |
| 6,201,289 B1 | 3/2001 | Jou |
| 6,212,306 B1 | 4/2001 | Cooper et al. |
| 6,233,286 B1 | 5/2001 | Wei |
| 6,272,926 B1 | 8/2001 | Fehrenbach et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,328,647 B1 | 12/2001 | Traudt |
| 6,330,255 B1 | 12/2001 | Hung |
| 6,331,892 B1 | 12/2001 | Green |
| 6,396,605 B1 | 5/2002 | Heflinger et al. |
| 6,422,084 B1 | 7/2002 | Fernald et al. |
| 6,425,290 B2 | 7/2002 | Willcox et al. |
| 6,439,055 B1 | 8/2002 | Maron et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,636 B1 | 12/2002 | Chen et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,522,797 B1 | 2/2003 | Siems et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,986 B2 | 5/2003 | Kashihara et al. |
| 6,581,465 B1 | 6/2003 | Waters et al. |
| 6,583,882 B2 | 6/2003 | Scruggs et al. |
| 6,594,022 B1 | 7/2003 | Watterson et al. |
| 6,597,458 B2 | 7/2003 | Tayag et al. |
| 6,603,560 B1 | 8/2003 | Islam |
| 6,608,685 B2 | 8/2003 | Wood et al. |
| 6,612,174 B2 | 9/2003 | Sittler et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,643,025 B2 | 11/2003 | Degertekin et al. |
| 6,647,160 B1 | 11/2003 | Chi et al. |
| 6,650,420 B2 | 11/2003 | Houston et al. |
| 6,668,105 B2 | 12/2003 | Chen et al. |
| 6,668,111 B2 | 12/2003 | Tapalian et al. |
| 6,668,656 B2 | 12/2003 | Fernald et al. |
| 6,680,472 B1 | 1/2004 | Thingbø et al. |
| 6,687,011 B1 | 2/2004 | Lee et al. |
| 6,687,036 B2 | 2/2004 | Riza |

| | | |
|---|---|---|
| 6,690,873 B2 | 2/2004 | Bendett et al. |
| 6,714,566 B1 | 3/2004 | Coldren et al. |
| 6,714,700 B2 | 3/2004 | Burger et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1 | 8/2004 | Bortz |
| 6,776,049 B2 | 8/2004 | Johnson et al. |
| 6,785,004 B2 | 8/2004 | Kersey et al. |
| 6,791,694 B2 | 9/2004 | Pezeshki |
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,829,259 B2 | 12/2004 | Pontis et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,921,894 B2 | 7/2005 | Swierkowski |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,139,081 B2 | 11/2006 | De Groot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,355,684 B2 | 4/2008 | Jeffers et al. |
| 7,355,726 B2 | 4/2008 | Jeffers et al. |
| 7,405,829 B2 | 7/2008 | Shen |
| 7,423,762 B2 | 9/2008 | Schmidt |
| 7,434,472 B2 | 10/2008 | Leitko et al. |
| 7,492,463 B2 | 2/2009 | Lopushansky et al. |
| 7,511,823 B2 * | 3/2009 | Schultz et al. ............... 356/480 |
| 2001/0013934 A1 | 8/2001 | Varnham et al. |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1 | 11/2002 | Needham et al. |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0043697 A1 | 3/2003 | Vakoc |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0159518 A1 * | 8/2003 | Sawatari et al. ............... 73/705 |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 | 10/2005 | Belleville |
| 2005/0241399 A1 | 11/2005 | Lopushansky et al. |
| 2005/0242096 A1 | 11/2005 | Jaghab |
| 2006/0034569 A1 | 2/2006 | Shih et al. |
| 2006/0126070 A1 | 6/2006 | Kauppinen |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 * | 12/2008 | Riza et al. ............... 356/503 |
| 2009/0056447 A1 | 3/2009 | Berthold et al. |
| 2009/0086214 A1 | 4/2009 | Chin |

FOREIGN PATENT DOCUMENTS

| | | |
|---|---|---|
| DE | 3411096 | 6/1983 |
| EP | 0397388 | 11/1990 |
| EP | 0400939 | 12/1990 |
| EP | 0452993 | 10/1991 |
| EP | 0549166 | 6/1993 |
| EP | 0571107 | 11/1993 |
| EP | 0597345 | 11/1999 |
| EP | 1586854 | 10/2005 |
| GB | 1168971 | 10/1969 |

OTHER PUBLICATIONS

R. L. Johnson, et al., "Miniature Instrument for the Measurement of Gap Thickness Using Plychromatic Interferometry", Center for Astronomical Adaptive Optics, Steward Obser., U of AZ, Tucson.

Macdougall, Trevor W. and Sanders, Paul E., "Large Diameter Waveguide Bragg Grating Components and Their Application in Downhill Oil & Gas", Wetherford International, Wallingford, CT.

Wavelength Multiplexing of Micromechanical System Pressure and Temperature Sensors Using Fiber Bragg Gratings and Arrayed Waveguide Gratings, Li et al., Optical Engineering Feb. 2003, p. 431-438.

Optical Fiber Sensor Technology, Grattand Meggitt, 2000, pp. 312-313.

Fiber Optic Sensors, UDD, 1991, p. 147.

IEEE Micro Electro Mechanical Systems Conference, Feb. 7, 1993, Ft. Lauderdale, FL; pp. 230-235; K. Aratani et al., "Process and design considerations for surface icromachined beams for a tuneable interferometer array in silicon".

Journal of Vacuum Science and Technology: Part A, vol. 8, No. 4, Jul. 1990, New York US; pp. 3606-3613; D. W. Burns et al., "Thin films for micromechanical sensors".

Optical Engineering, vol. 31, No. 8, Aug. 1992, Bellingham US, pp. 1638-1642; D. Angelidis et al., "Optical micromachined pressure sensor for aerospace application".

Sensors and Actuators, vol. 20, No. 1-2, Nov. 15, 1989, Lausanne, CH, pp. 143-151; M. W. Putty et al., "Process integration for active polysilican resonant microstructures".

Sensors and Actuators, A., vol. A21-A23, No. 1-3, Feb. 1990, Lausanne, CH, pp. 387-390, R. M. Itcher et al., "Optothermal drive of silicon resonators: the influence of surface coatings".

IEE Proceedings D. Control Theory & Applications, vol. 135, No. 5, Sep. 1988, Stevenage, GB, pp. 364-368, M.J. Tudor et al., "Silicon resonator sensors; interrogation techniques and characteristics".

"Single Mode Fiber Optics", 1983, Jeunhomme, p. 100.

Electronics Letters, vol. 22, No. 21; Oct. 9, 1986; Stevenage, GB; pp. 1097-1099; M. V. Andres et al., "Optical activation of a silicon vibrating sensor".

IEEE Sensors Journal, vol. 3, No. 6, pp. 812-817, Dec. 2003, Tseng et al. "Polymer MEMS-Based Fabry-Perot Shear Stress Sensor".

Kersey, Alan D., Fiber Grating Sensors; Journal of Lightwave Technology, vol. 15, No. 8, © 1997 IEEE, Aug. 1997.

J.R. Clowes, et al., Effects of High Temperature and Pressure on Silica Optical Fiber Sensors; IEEE Photonics Technology Letters, vol. 10, No. 3; © 1998 IEEE, Mar. 1998.

J.M. Senior, Multiplexing Techniques for Noninterferometric Optical Point-Sensor Networks: A Review, Fiber and Integrated Optics, 17:3-20, Copyright 1998 Taylor & Francis, 1998.

Chi Chiu Chan, et al., Performance Analysis of a Time-Division-Multiplexed Fiber Bragg Grating Sensor Array by Use of a Tunable Laser Source, IEEE Journal of Selected Topics in Quantum Electronics, vol. 6, No. 5; © 2000 IEEE, Sep./Oct. 2000.

* cited by examiner

TRANSDUCER FOR MEASURING ENVIRONMENTAL PARAMETERS

CROSS-REFERENCE TO RELATED APPLICATIONS

This application claims priority from U.S. Provisional Patent Application Ser. No. 60/897,093 entitled "PRESSURE TRANSDUCER FOR USE AT HIGH PRESSURES" filed on Jan. 24, 2007, which is hereby incorporated by reference in its entirety.

FIELD OF THE INVENTION

The present invention generally relates to pressure and temperature transducers and more particularly to small diameter transducers for use in measuring high pressures at high temperatures.

BACKGROUND OF THE INVENTION

Apparatus for measuring high pressures at low temperatures are known in the prior art. For example, measurement of pressure at temperatures below 350° F. is frequently accomplished with pressure transducers that position a large diameter diaphragm such that the diaphragm is exposed to the pressure to be measured. Such diaphragms are typically thin or corrugated and have relatively large diameters. The diaphragms are often rigidly clamped or welded in place at the perimeter of the diaphragm such that the central portion of the diaphragm is compliant and deflects proportionally in response to pressure. The amount of deflection of the diaphragm may be used to calculate the pressure.

Pressure measurement techniques for relatively moderate temperatures are well known in the prior art. As the range of pressure to be measured in a family of transducers increases, it may be necessary to increase the thickness of the diaphragm to assure all of the transducers in the family deflect approximately the same amount when each transducer in the family is subjected to 100% of its pressure rating. All other factors being equal, the stress on the diaphragm increases as the thickness of the diaphragm increases or as the diameter of the diaphragm decreases. So, for a given diameter of transducer, there exists a maximum pressure rating above which the stresses in the diaphragm exceed the allowable stresses for the material, and the transducer begins to yield and deform plastically. Yielding and plastic deformation occur because the bending stresses around the circumference of the diaphragm exceeds the elastic strength of the diaphragm material. Such yielding and plastic deformation results in a loss of repeatability and stability of the transducer.

Pressure measurement at high temperatures creates additional problems due to the melting point of some materials used in conventional transducers and because the strength of most materials diminish at high temperatures. Therefore, there exists a need for novel arrangements of apparatus and novel methods for using such apparatus to measure relatively high pressures at high temperatures with small diameter transducers.

SUMMARY OF THE INVENTION

Apparatus, methods, and other embodiments associated with measuring environmental parameters are described herein. In one embodiment, a transducer comprises a tube, an elongated member, a first reflective surface, a second reflective surface, and an optical fiber. The tube has a first end and a second end, and the elongated member also has a first end and a second end, with the first end of the elongated member secured to the tube. The second reflective surface is secured to the second end of said elongated member, and the first reflective surface is spaced apart from the second reflective surface and secured to the second end of the tube. The optical fiber is positioned to direct light towards the first and second reflective surfaces and to collect the reflected light from these two surfaces. As the pressure exerted on the transducer changes, the gap between the two reflective surfaces changes. The two reflective surfaces comprise an interferometric sensor, and the light reflected from these two surfaces may be interrogated to determine the precise gap between the two surfaces at any pressure. By calibrating the transducer at known pressures and temperatures, one can determine the precise pressure or temperature for any measured gap.

DESCRIPTION OF THE DRAWINGS

Operation of the invention may be better understood by reference to the following detailed description taken in connection with the following illustrations, wherein.

DETAILED DESCRIPTION

While the invention is described herein with reference to a number of embodiments and uses, it should be clear that the invention should not be limited to such embodiments or uses. The description of the embodiments and uses herein are illustrative only and should not limit the scope of the invention as claimed.

Apparatus for measuring high pressure at high temperatures and methods of using such apparatus may be arranged such that the environmental parameters being measured do not damage the sensing apparatus or cause the sensing apparatus to inaccurately measure the environmental parameter. For example, when measuring high pressures with a transducer, the transducer may be arranged such that forces applied by the high pressure being measured do not damage or otherwise negatively affect the sensing components measuring the pressure. In an embodiment, the components that measure the high pressure do not directly bear the forces applied by the high pressures; however, the components are arranged such that the pressure affects the components, and those effects may be quantified to accurately measure the pressure.

Similarly, when measuring a high temperature with a transducer, the transducer may be arranged such that the temperature does not cause undue stress that may damage or otherwise negatively affect the sensing components that measure the temperature. In an embodiment, a transducer is arranged such that a series of certain components are selected such that the rate of thermal expansion of each of the components is similar, and bonds between such components are not compromised by thermal stresses at high temperatures. In addition, transducers may be arranged such that the transducer may measure a high pressure in an environment that is also subject to high temperature. In an embodiment, the components that measure the high pressure are arranged such that thermal expansion of the components is similar, and bonds between such components are not compromised at high temperatures, thus resulting in accurate measurements of the high pressure.

In an embodiment of a transducer as described herein, the sensing components may include fiber optic sensing components such as, for example, optical fibers, Fabry-Perot interferometric sensors, and the like. Fiber optic sensing components may be well suited for use with transducers as described herein because such components can typically withstand high temperatures and harsh environments and are not generally affected by electromagnetic interference.

Figure 1:
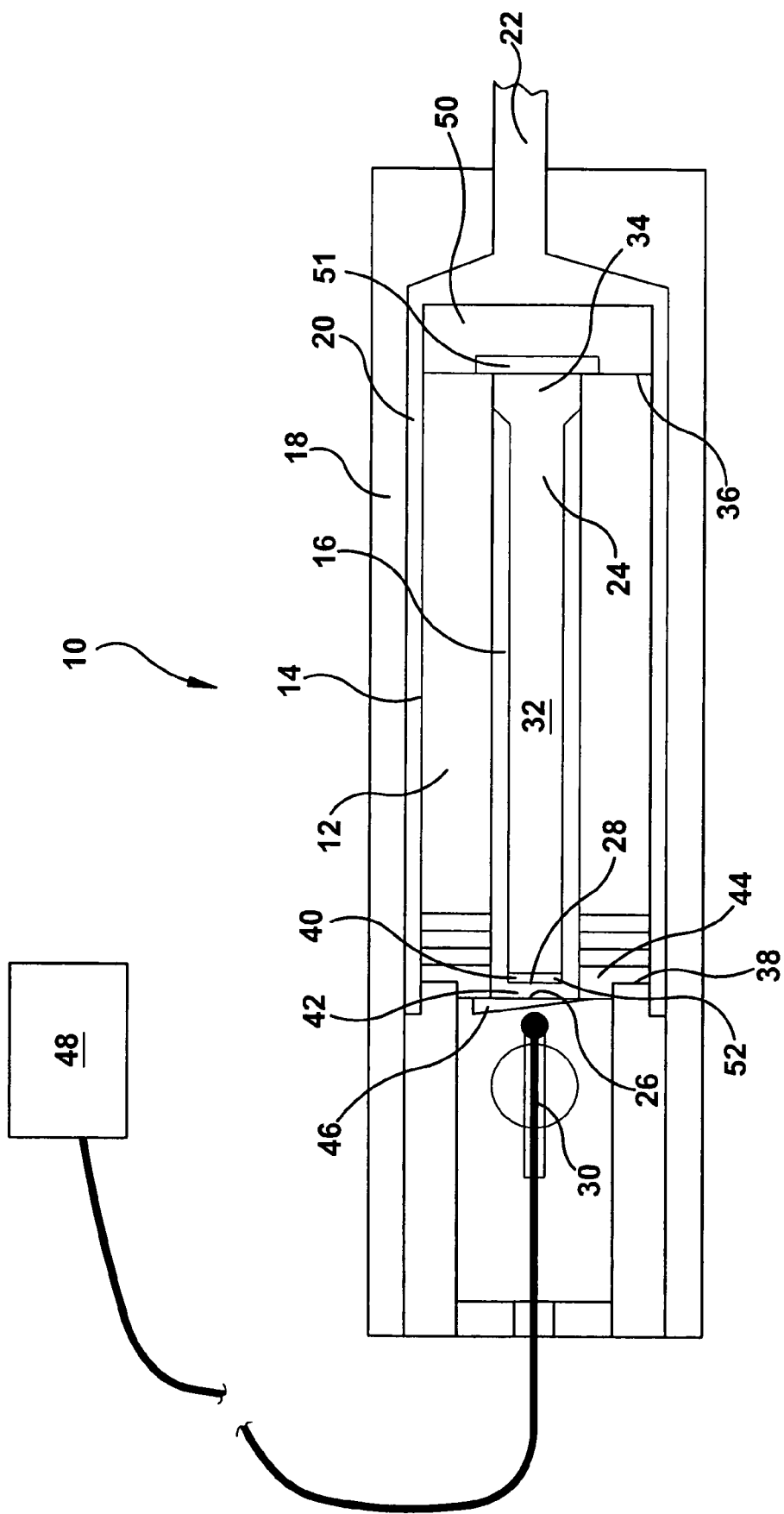
FIG. 1 is a schematic illustration of an interferometric transducer to measure environmental parameters.

An exemplary embodiment of a transducer 10 arranged to measure high pressure is schematically illustrated in FIG. 1. Generally, the transducer 10 is arranged such that the components that measure the high pressure are shielded from that high pressure by a high strength component, such as a tube 12. In the illustrative embodiment shown in FIG. 1, the tube 12 includes an external surface 14 and an internal cavity 16. The tube 12 is positioned within a housing 18 that forms an annular cavity 20 around the tube 12. When the transducer 10 is positioned in a high-pressure environment, such as at the bottom of an oil well, the exterior surface 14 of the tube 12 bears the full force of the high pressure, and any components positioned or located in the internal cavity 16 of the tube 12 do not directly bear the force of the high pressure. In addition to being fabricated from a high strength material, the tube 12 also includes relatively thick walls to withstand the forces of the applied pressure.

A fluid inlet 22 allows fluid from the surrounding environment to enter the annular cavity 20 and apply pressure to the exterior surface 14 of the tube 12. For example, when a transducer 10 is lowered to the bottom of an oil well, oil flows through the inlet 22 and into the annular cavity 20 surrounding the tube 12 and applies pressure to the exterior 14 of the tube 12 that is equal to the pressure at the bottom of that oil well.

Exemplary components positioned within the interior cavity 16 of the tube 12 include: an elongated member 24, a first reflective surface 26, a second reflective surface 28, and an optical fiber 30. The elongated member 24 may be a pin with an elongated body 32 and a flattened head portion 34. The head 34 of the pin 24 may be secured to a first end 36 of the tube 12 and the body 32 of the pin 24 may extend away from the first end 36 of the tube 12 towards a second and opposing end 38 of the tube 12. The head portion 34 of the pin 24 may be secured to the first end 36 of the tube 12 by welding to promote proper alignment and positioning of the elongated body 32 of the pin 24 with respect to the tube 12. Although the pin 24 is described and shown herein as welded to the tube 12, it will be readily understood by those skilled in the art that any number of securing methods may be used to secure a pin to a tube. For example, a pin may be secured to the tube with adhesive bonds, a pin may be integrally formed with the tube, a pin may be mechanically fastened to the tube, the cavity may be machined using electrostatic discharge machining methods, and the like.

The second reflective surface 28 may be incorporated or secured to a component 52, such as a support member or substrate, secured to an end 40 of the pin 24 located closest to the second end 38 of the tube 12. The substrate 52 may be positioned such that the second reflective surface 28 is perpendicular or nearly perpendicular to the length of the elongated body 32 of the pin 24. In an alternative embodiment, the second reflective surface 28 may be incorporated into the end 40 of the pin 24. For example, the end 40 of the pin 24 may be polished to form a reflective surface, or a reflective surface may be otherwise formed in the end 40 of the pin 24 during fabrication.

The first reflective surface 26 may be directly or indirectly secured to the second end 38 of the tube 12 and positioned to be parallel and spaced apart from the second reflective surface 28. Such positioning of the reflective surfaces 26, 28 forms a gap 42 between the reflective surfaces 26, 28. In one embodiment, an annular ring 44, which may be made of glass, metal, or other such material, is secured to the second end 38 of the tube 12. A glass window 46 with a tapered surface 54 and an opposing non-tapered surface is secured to the annular ring 44. The non-tapered surface may be polished or coated such that it forms the first reflective surface 26. Once the non-tapered surface is polished or coated, the window 46 may be secured to the annular ring 44. In such an arrangement, the first reflective surface 26 may be positioned parallel to and spaced apart from the second reflective surface 28 to form the gap 42 between the surfaces 26, 28. The optical fiber 30 may be positioned proximate to the first reflective surface 26. The optical fiber 30 may be arranged to direct light at the first and second reflective surfaces 26, 28 and receive light that is reflected back by the first and second reflective surfaces 26, 28. Such a gap 42 may form a Fabry-Perot interferometer sensor.

The first reflective surface 26 is partially reflective. That is the surface 26 will reflect a portion of the light directed to it by the optical fiber 30 and allow a portion of the light to pass through the surface 26 and on to the second reflective surface 28. The portion of the light reflected by the first reflective surface 26 is reflected back into the optical fiber 30. The second reflective surface 28 may be arranged to be 100% reflective or partially reflective. The light reflected from the second reflective surface 28 is reflected back through the first reflective surface 26 and into the optical fiber 30. The light reflected from the reflective surfaces 26, 28 and received by the optical fiber 30 may be measured by computerized equipment 48 to quantitatively determine the value or length of the gap 42. The computerized equipment 48 may be positioned relatively near the transducer 10 or may be positioned at great distance from the transducer 10. For example, a transducer 10 located in an oil well may relay optical signals several thousand feet to computerized equipment 48 located on the earth's surface above the oil well. As will be described below, by measuring the value of the gap 42, the value of the pressure in the reservoir exerted on the transducer 10 may be determined. Apparatus and methods of arranging reflective surfaces and measurement of light reflected from those reflective surfaces are described in U.S. patent application Ser. No. 11/377,050 to Lopushansky et al., and entitled "High Intensity Fabry-Perot Sensor," which is hereby incorporated by reference in its entirety.

In the embodiment illustrated in FIG. 1, a cap 50 is secured to the first end 36 of the tube 12. The cap 50 is arranged to protect the head portion 34 of the pin 24 from the high forces applied to the fluid in the annular cavity 20. Similar to the tube 12, the cap 50 is fabricated from a high strength material and includes relatively thick walls to withstand the forces applied by the surrounding pressure. The cap 50 may include a cavity 51 positioned proximate to where the head 34 portion of the pin 24 is secured to the tube 12. The cavity 51 further insures that the head portion 34 is protected from high pressures by avoiding contact with the cap 50 at the location where the head 34 is secured to the tube 12.

The tube 12 and cap 50 may be generally cylindrical. The transducer 10 may be arranged such that when high pressures are applied to the external surfaces 14 of the tube 12 and cap 50, the physical dimensions of the tube 12 change in response to the high pressure. These dimensional changes to the tube 12 are relayed to the pin 24 to cause the end 40 of the pin 24 securing the second reflective surface 28 to move and thus change the value or length of the gap 42 between the reflective surfaces 26, 28. For example, if a transducer 10 is located at the bottom of an oil well, oil may flow into the annular cavity 20 through the inlet 22 and apply a hydrostatic pressure to the external surface 14 of the tube 12. Such pressure subjects the cylindrical tube 12 to radial compressive forces substantially equal to the surface area of the tube 12 multiplied by the pressure. In addition, this hydrostatic pressure also applies a force on the cap 50, which translates the pressure as a longitudinal compressive force on the tube 12 that is substantially equal to the cross-sectional area of the tube 12 multiplied by the pressure. The cavity 51 in the cap 50 positioned proximate to the location of the pin's 24 attachment to the tube 12 further insures that any force on the cap 50 is translated as a longitudinal compressive force on the tube 12.

The radial forces generally result in an elongation of the tube 12 in proportion with the Poisson ratio for the material of the tube 12. Elongation of the tube 12 generally results in an increase in the gap 42 between the reflective surfaces 26, 28. The elongation of tube 12 causes the second reflective surface 28 secured to the end 40 of the pin 24 to move, because the head portion 34 of the pin 24 is attached to the first end 36 of the tube 12. Furthermore, since the first reflective surface 26 is secured to the second end 38 of the tube 12, it will be understood that the gap 42 between the reflective surfaces 26, 28 increases as the tube 12 elongates. The compressive forces generally result in a compression of the tube 12 in proportion to Young's modulus for the material of the tube 12; therefore, the compressive forces typically cause the gap 42 to decrease. As will be understood, the net change in the length of the tube 12, and therefore the net change of the gap 42, may be either positive or negative depending on the pressure, properties of the material of the tube 12, and general dimensions of the transducer 10. For a given pressure the amount of deflection is a function of the length of the tube and not its diameter. It is therefore possible to design a family of transducers with the same diameter, and that diameter may be relatively small.

As also will be understood, design calculations may be performed to associate any gap length 42 with a pressure. By knowing the material properties of the tube 12—i.e., Poisson ratio and Young's modulus for the material from which the tube 12 is fabricated—and the physical dimensions of the transducer 10—the length, exterior diameter, and interior diameter of the tube 12 and the gap length 42 at an ambient pressure, and the gap at zero pressure—a gap length 42 may be calculated for any pressure applied to the transducer 10.

Such a transducer 10 may be subjected to a high-pressure environment and light may be provided from the optical fiber 30 to the first and second reflective surfaces 26, 28. Two interfering light signals may be reflected back into the optical fiber 30 from the reflective surfaces 26, 28. The interfering light signals may be channeled through the optical fiber 30 to the computerized equipment 48, where the interfering signals may be analyzed to calculate the actual gap length 42. Once the gap length 42 is calculated, that length 42 may be translated into a value for the pressure being exerted on the transducer 10 based on prior calibration data or by using the design calculations.

In one embodiment, a transducer that is 1.5 inches long and made of a high strength alloy, such as Inconel alloy 718 (Inconel-718), deflects about 10 micrometers for an applied pressure of 20,000 pounds per square inch ("psi"). Such deflections may be measured to within 0.01% providing precise measurements of gaps and applied pressure from the light reflected by reflective surfaces 26, 28 of the Fabry-Perot interferometer sensor.

Optionally heat-treating the material from which the transducer 10 is fabricated may improve the stability of the transducer 10. For example, heat-treating a transducer 10 may reduce long-term drift of a transducer 10 subjected to high pressures for an extended period of time. In the embodiment of a transducer 10 fabricated from Inconel-718, the transducer 10 may be solution annealed after welding and age hardened to form a fine grain structure with high strength properties. Such an arrangement may withstand stress of 180,000 psi. Even in the solution annealed stage, Inconel-718 transducer 10 may withstand stress of 150,000 psi.

In an embodiment, the transducer 10 may be fabricated from an alloy or a glass such as, for example, Inconel-718 alloy, Hastelloy, borosilicate glass, or leaded glass. Indeed, the transducer 10 may be fabricated from any number of materials and should not be deemed as limited to any specific material or combination of materials.

In another embodiment, the transducer 10 illustrated in FIG. 1 may also be arranged to measure temperature. In such an embodiment, the elongated body or pin 24 may be fabricated from a material that has a different coefficient of thermal expansion than the material used to fabricate the tube 12. As such a transducer 10 is exposed to changes in temperature, the pin 24 and tube 12 will expand and contract at different rates. Similar to the description for pressure, design calculations may be performed to associate any gap length 42 with a temperature. By knowing the material properties of the tube 12 and pin 24—i.e., the coefficients of thermal expansion—and the physical relationships of the components of the transducer 10—the lengths of the pin 24 and tube 12 and the gap length 42 at an ambient temperature—a gap length 42 may be calculated for any temperature to which the transducer 10 is exposed. Transducer 10 may be exposed to an elevated temperature and light may be provided from the optical fiber 30 to the first and second reflective surfaces 26, 28. Two interfering light signals may be reflected back into the optical fiber 30 from the reflective surfaces 26, 28. The interfering light signals may be channeled through the optical fiber 30 to the computerized equipment 48, where the interfering signals may be analyzed to calculate the actual gap length 42. Once the gap length 42 is calculated, that length 42 may be translated into a value for the temperature to which the transducer 10 is exposed based on prior calibrations or design calculations.

Figure 2:
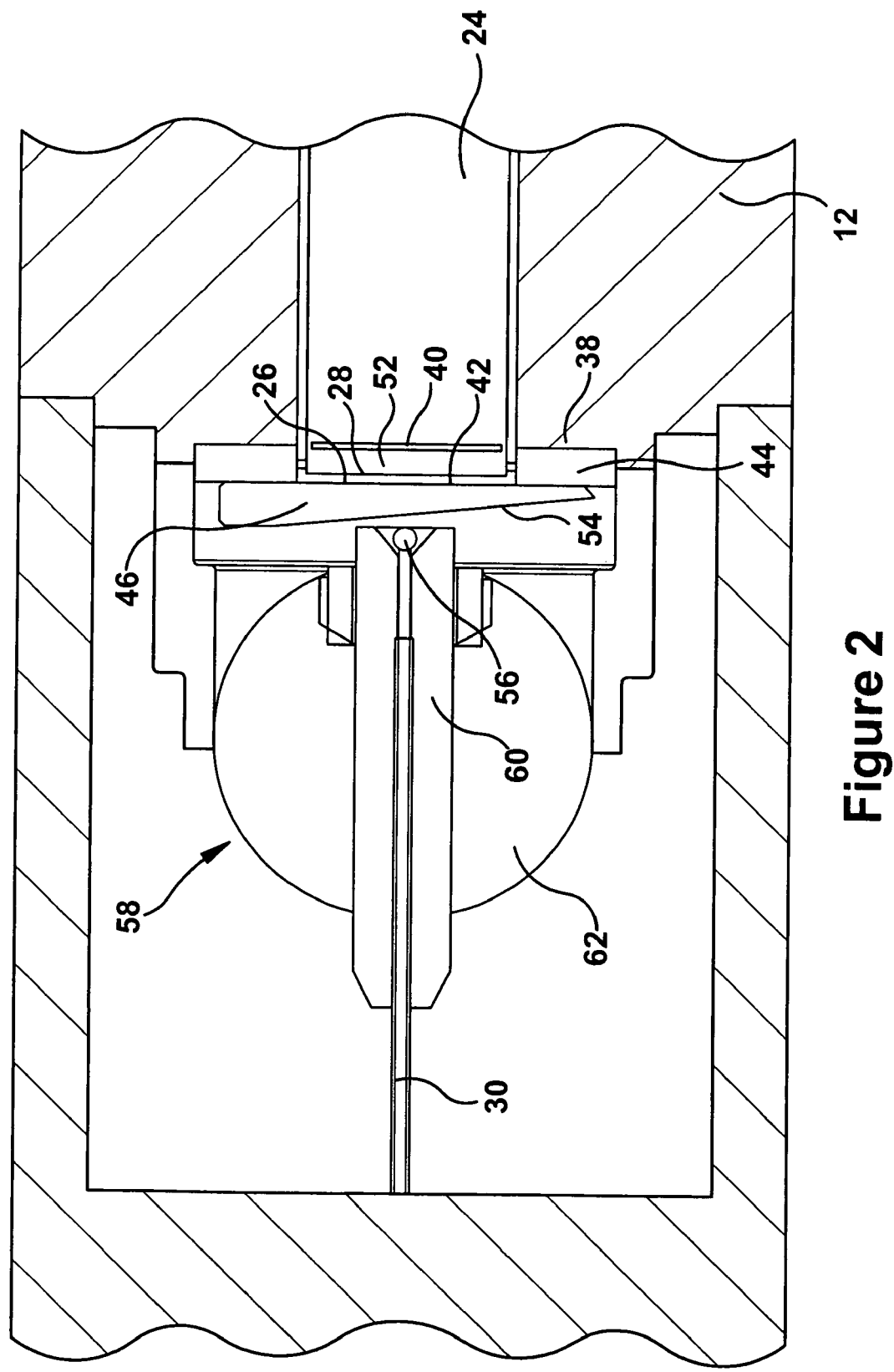
FIG. 2 is a schematic illustration of a Fabry-Perot interferometer sensor for use with a transducer.

In another embodiment, a portion of a transducer 10 is schematically illustrated in FIG. 2. The tapered window 46 is bonded to the second end 38 of the tube 12 through an annular ring 44, which is secured to the second end 38. The annular ring 44 may be fabricated from a glass with a relatively large coefficient of thermal expansion such as, for example, Schott D-263 glass, leaded glass, or borosilicate glass. In one alternative, the annular ring 44 may be fabricated from a metal with relatively low coefficient of thermal expansion such as Kovar, which has a thermal expansion lower than Inconel-718, which may be used to fabricate the tube.

As shown in FIG. 2, a substrate 52 with a polished glass surface is bonded to the free end 40 of the pin 24. The Fabry-Perot sensor gap 42 is formed between two reflective surfaces. The first reflective surface 26 is the surface of the tapered window 46 that is bonded to the annular ring 44. The second reflective surface 28 is the polished glass surface of the substrate 52 coupled to the free end 40 of the pin 24. In such an embodiment, the material that forms the reflective surfaces may have similar and relatively large coefficients of thermal expansion. Some examples of such materials include, but are not limited to, Schott D-263 glass, leaded glass, or borosilicate glass. The reflective surfaces 26, 28 may be polished to a flatness that is better than $\lambda/10$ and an optical surface finish standard of scratch/dig of 60/40. As shown in FIG. 2, the second end 38 of the tube includes an inner aperture to allow the end 40 of the pin 24 to move freely along the longitudinal axis of pin 24. The length of the gap 42 may vary depending on the how the transducer will be used. For example, for long-range applications using a single mode optical fiber, a gap length of 80 micrometers may be appropriate. In another example, for short-range applications using multimode optical fibers, a gap length of 20 micrometers may be appropriate.

Figure 3:
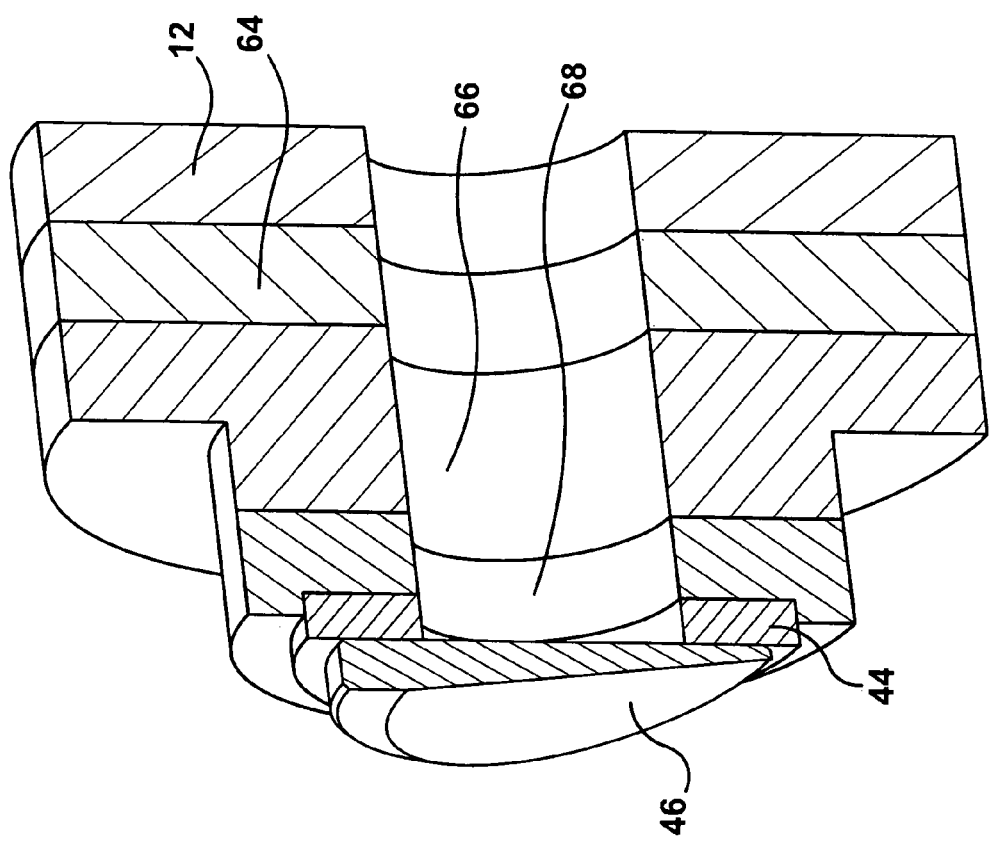
FIG. 3 is a cross-sectional illustration of a portion of an interferometric transducer that defines a graded glass to metal seal.

FIG. 3 schematically illustrates a cross-sectional view of an exemplary arrangement for achieving a low thermal stress joint and a secure bond between the annular ring 44 and the tube 12. The arrangement includes a series of metal alloys, where each metal alloy may have a different coefficient of thermal expansion. The metal alloys are welded in series, with each successive metal having a lower coefficient of thermal expansion to reduce or eliminate thermal stress between the annular ring 44 and the tube 12 during large changes in temperature. For example, the material with the largest coefficient of thermal expansion is the tube 12, which may be fabricated from Inconel-718. A first ring 64 is fabricated from Hastelloy C276, and is welded to the tube 12; a second ring 66 is fabricated from alloy 52, and is welded to the first ring 64; and a third ring 68 is fabricated from alloy 48, and is welded to the second ring 66. The annular ring 44 is bonded to the third ring 68 and the tapered window 46 is bonded to the annular ring 44. Alloy 48 and alloy 52 are alloys with different relative concentrations of iron and nickel. By defining the length and selection of materials used in the pin 24 and the tube 12, the thermal sensitivity of the transducer 10 may be such that the transducer 10 is insensitive or highly sensitive to temperature changes.

A reflective dielectric coating may be applied to the surface of the tapered window 46 nearest the pin 24 to form the first reflective surface 26. A reflective dielectric coating may also be applied to the polished glass surface of the substrate 52 bonded to the pin 24 to form the second reflective surface 28. For long-range, single mode applications, a highly reflective coating, i.e., 85% reflectance, may be utilized. For short-range, multimode applications a less reflective coating, i.e., 35% may be utilized. The tapered window 46 may be fabricated from Schott D-263 glass, leaded glass, or borosilicate glass. As shown in FIG. 2, the unbonded surface 54 of the tapered window 46 may be arranged at an angle to eliminate unwanted reflections from that surface 54 of the window 46, which is located closest to the optical fiber 30. The angled surface 54 prevents such unwanted reflections from reentering the optical fiber 30 and interacting with the pair of interfering reflected signals. In one embodiment, the angled surface 54 may be arranged at an angle that is greater than 6 degrees.

In the embodiment illustrated in FIG. 2, the Fabry-Perot gap is formed with a structure that is subject to very low thermal stress. In addition, the dielectric interferometer is not subject to oxidation and does not suffer from issues of drift and degradation over time that may be attributed to the oxidation of metal structures.

As described in U.S. patent application Ser. No. 11/377, 050, a ball lens 56 may be positioned at the end of the optical fiber 30. The ball lens 56 may be used to deliver light to the reflective surfaces 26, 28 by collimating the light directed to those surfaces 26, 28. The ball lens 56 may be fused to the end of the optical fiber 30 or may be a separate component aligned with the optical fiber 30. A ball lens 56 may be fused to the end of the optical fiber 30 by heating the optical fiber 30 to its melting point, where surface tension produces a sphere of transparent silica, which forms the ball lens 56 upon cooling. Such a heating and cooling process inherently centers the ball lens 56 on the longitudinal axis of the optical fiber 30. In one embodiment, the diameter of the ball lens 56 is approximately 340 micrometers.

As described in U.S. patent application Ser. No. 11/377, 050, a ball and socket assembly 58 may be used to better align the optical fiber 30 and the ball lens 56. A ferrule 60 is positioned within the ball and socket assembly 58 and holds the optical fiber 30 such that the ball 62 may be rotated to align the optical fiber 30 as desired. The ball 62 may also be slid laterally to position the ball lens 56 relative to the tapered window 46. In another embodiment, alignment of the optical fiber 30 may be accomplished by polishing the end of the structure that supports the ball lens 56 at an angle that assures the light beam is perpendicular to the first and second reflective surfaces 26, 28.

Figure 4:
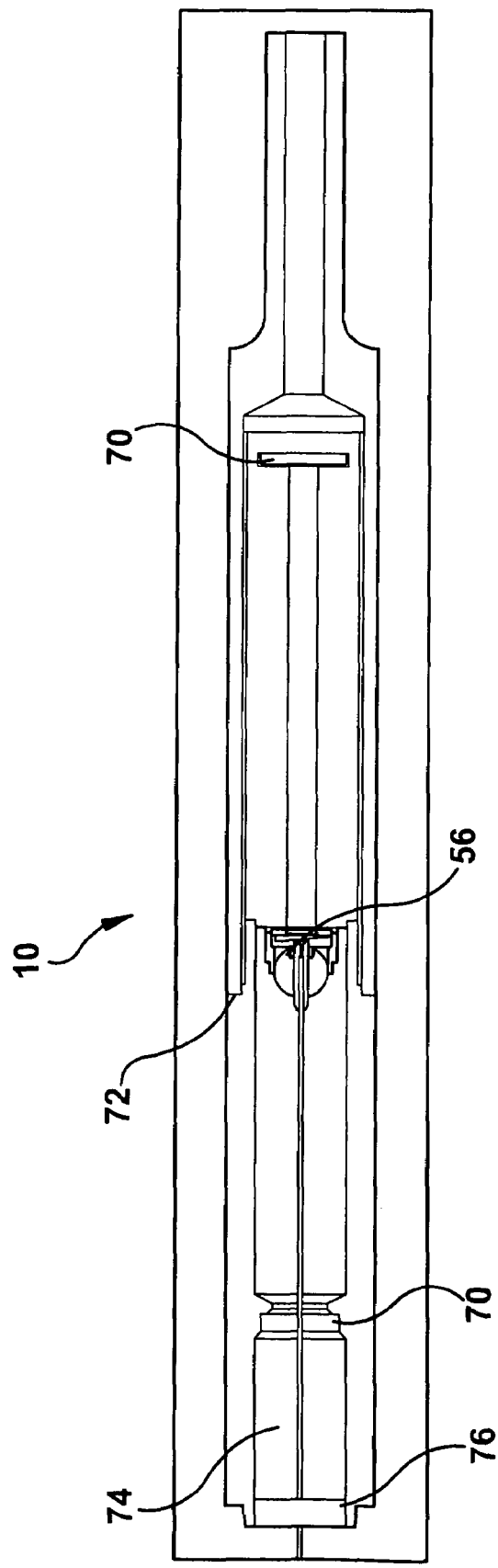
FIG. 4 is a schematic illustration of a transducer that includes hydrogen getters and vacuum seal for measuring absolute pressure.

FIG. 4 illustrates a transducer 10 that includes a pair of hydrogen getters 70 that absorb hydrogen to maintain a high stability (low drift) of the transducer 10. A getter 70 is arranged to absorb hydrogen ions and molecules diffusing through the transducer 10 when the transducer 10 is set to measure absolute pressure. To measure absolute pressure, the cavity 74 inside the transducer body is evacuated and sealed 76. Absorption of hydrogen by the getter 70 decreases or eliminates the probability that stray hydrogen molecules will increase the pressure inside the evacuated transducer 10 and lead to inaccurate pressure readings over time. An increase in hydrogen partial pressure may also change the thermal sensitivity of the transducer 10 and result in a loss of calibration of the transducer 10 over time. The getters 70 may be positioned at the end of the cap or behind the ball lens assembly. The getters 70 may be sized for the expected service life of the transducer 10

Alternatively, the transducer 10 may function without the getters 70 if the Fabry-Perot gap 42 is vented to atmospheric pressure and the transducer 10 is designed for measuring gage pressure. In such an embodiment, any hydrogen that diffuses into the transducer 10 will escape into the atmosphere and will not affect the length of the gap.

In another embodiment, the pressure inlet 22 may be positioned adjacent to the end cap 50 as shown in FIG. 1, and an external pressure isolation step 72 shown in FIG. 4 may be positioned to the left of the ball lens 56 (with respect to FIG. 4) to cause the transducer 10 to be insensitive to applied external pressure, The pressure transducer 10 may also be affected by thermal sensitivity and may require a temperature measurement or thermal correction to ensure precise and accurate measurements. For example, a temperature sensor may be inserted behind the ball lens 56 to accurately measure the temperature of the transducer 10. The signal processor may thus be corrected for known thermal sensitivity of the pressure sensor.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A transducer for measuring environmental parameters, the transducer comprising:

a tube having a first end and a second end;

an elongated member having a first end and a second end, wherein said first end of said elongated member is secured to said tube;

a first reflective surface and a second reflective surface, where said second reflective surface is positioned proximate to said second end of said elongated member and said first reflective surface is spaced apart from said second reflective surface; and an optical fiber positioned to direct light towards said first and second reflective surfaces.

2. The transducer of claim 1, further comprising a cap secured to said first end of said tube.

3. The transducer of claim 1, wherein said first end of said elongated member is secured to said first end of said tube.

4. The transducer of claim 1, wherein said first and second reflective surfaces form a Fabry-Perot interferometer sensor.

5. The transducer of claim 4, further comprising a computerized system coupled to said optical fiber to measure light signals reflected into said optical fiber from said first and second reflective surfaces.

6. The transducer of claim 5, wherein said transducer determines a value for pressure applied to said transducer.

7. The transducer of claim 5, wherein said tube is comprised of a material with a first coefficient of thermal expansion, and said elongated member is comprised of a second coefficient of thermal expansion that is different from said first coefficient of thermal expansion.

8. The transducer of claim 7, wherein said transducer determines a value for temperature of said transducer.

9. The transducer of claim 1, further comprising a hydrogen-absorbing member.

10. The transducer of claim 1, further comprising a ball and socket assembly to secure and position said optical fiber.

11. The transducer of claim 1, further comprising an annular glass ring secured to said second end of said tube.

12. The transducer of claim 11, further comprising a tapered member secured to said annular ring, said annual ring comprised of glass or metal.

13. The transducer of claim 12, wherein the tapered member includes a second reflective surface.

14. The transducer of claim 1, further comprising a ball lens attached to said optical fiber.

15. The transducer of claim 1, further comprising a temperature sensor.

16. The transducer of claim 1, further comprising an external pressure isolation step.

17. A method for determining an environmental parameter comprising:

providing a transducer comprising a tube, an elongated member, a first reflective surface and a second reflective surface, where said second reflective surface is coupled to said elongated member and said first reflective surface is spaced apart from said second reflective surface, and an optical fiber positioned to direct light towards said first and second reflective surfaces;

gathering light reflected by said first and second reflective surfaces;

analyzing light reflected by said first and second reflective surfaces; and determining distance between said first and second reflective surfaces.

18. The method of claim 17, further comprising:

calculating a pressure associated with said distance between said first and second reflective surfaces; and determining pressure applied to said transducer from determined distance between said first and second reflective surfaces.

19. The method of claim 18, further comprising:

providing a temperature sensor with said transducer;

measuring temperature of transducer; and adjusting determined pressure from measured temperature of transducer.

20. The method of claim 17, further comprising:

calculating a temperature associated with said distance between said first and second reflective surfaces; and determine temperature of said transducer from determined distance between said first and second reflective surfaces.

* * * * *